US009977572B2

(12) United States Patent
Schimke (10) Patent No.: US 9,977,572 B2
(45) Date of Patent: May 22, 2018

(54) AUGMENTED REALITY APPEARANCE ENHANCEMENT (71) Applicant: Hallmark Cards, Incorporated, Kansas City, MO (US)

(72) Inventor: Scott A. Schimke, Leavenworth, KS (US)

(73) Assignee: Hallmark Cards, Incorporated, Kansas City, MO (US)

( * ) Notice: Subject to any disclaimer, the term of this patent is extended or adjusted under 35 U.S.C. 154(b) by 148 days.

(21) Appl. No.: 14/674,572

(22) Filed: Mar. 31, 2015

(65) Prior Publication Data

US 2015/0279117 A1 Oct. 1, 2015

Related U.S. Application Data (60) Provisional application No. 61/973,736, filed on Apr. 1, 2014.

(51) Int. Cl.
*G09G 5/00* (2006.01)
*G06F 3/0482* (2013.01)
(Continued)

(52) U.S. Cl.
CPC ............ *G06F 3/0482* (2013.01); *G06F 1/163* (2013.01); *G06F 3/011* (2013.01); *G06F 3/0304* (2013.01); *G06F 3/048* (2013.01); *G06F 17/30* (2013.01); *G06F 21/32* (2013.01); *G06T 11/00* (2013.01); *G06T 19/006* (2013.01); *G06T 2200/24* (2013.01)

(58) Field of Classification Search
CPC .................................................... G06T 19/006
See application file for complete search history.

(56) References Cited

U.S. PATENT DOCUMENTS 7,194,327 B2    3/2007 Lam
7,471,301 B2    12/2008 Lefevre
(Continued)

OTHER PUBLICATIONS

Anderson et al., YouMove: Enhancing Movement Training with an Augmented Reality Mirror, UIST'13, Oct. 2013, pp. 311-320.*
(Continued)

*Primary Examiner* — Charles Tseng
(74) *Attorney, Agent, or Firm* — Shook, Hardy & Bacon L.L.P.

(57) ABSTRACT

Systems, methods, and devices are provided for altering an appearance of acquaintances when viewed through smart glasses, which may be altered using augmented reality technology. In particular, an embodiment of the invention is directed to allowing users to specify their appearances to others when viewed by others wearing smart glasses. The others viewing the user through smart glasses include friends, family, contacts, or other acquaintances, which may be specified in one or more social networks or contacts databases. The altered appearance that is displayed may be based on the particular relationship between the user and the viewer. For example, a user may appear as a particular superhero to his friends on a social network website, as having a cartoon feature (such as an enormous head) to his children, as normal to his mother and business contacts, and as wearing a Hawaiian shirt to his closest buddies.

20 Claims, 9 Drawing Sheets (51) Int. Cl.
*G06T 19/00* (2011.01)
*G06T 11/00* (2006.01)
*G06F 1/16* (2006.01)
*G06F 17/30* (2006.01)
*G06F 3/01* (2006.01)
*G06F 3/03* (2006.01)
*G06F 3/048* (2013.01)
*G06F 21/32* (2013.01)

(56) References Cited

U.S. PATENT DOCUMENTS

| | | | |
|---|---|---|---|
| 2002/0004763 | A1 | 1/2002 | Lam |
| 2005/0253850 | A1* | 11/2005 | Kang ............... H04M 1/72544 345/473 |
| 2005/0289474 | A1 | 12/2005 | Master et al. |
| 2006/0038833 | A1 | 2/2006 | Mallinson et al. |
| 2008/0250332 | A1* | 10/2008 | Farrell .................. G06Q 10/10 715/753 |
| 2009/0177974 | A1* | 7/2009 | Cox ................... H04L 12/1818 715/747 |
| 2009/0300525 | A1* | 12/2009 | Jolliff ............... H04M 1/72544 715/764 |
| 2010/0045697 | A1* | 2/2010 | Reville .................. A63F 13/12 345/619 |
| 2010/0083140 | A1* | 4/2010 | Dawson ................. A63F 13/12 715/757 |
| 2011/0029889 | A1* | 2/2011 | Karstens ............... A63F 13/335 715/745 |
| 2012/0092328 | A1* | 4/2012 | Flaks .................. G02B 27/017 345/419 |
| 2012/0162255 | A1* | 6/2012 | Ganapathy ............. H04L 67/38 345/633 |
| 2012/0201472 | A1* | 8/2012 | Blanchflower .... G06K 9/00671 382/224 |
| 2013/0021374 | A1* | 1/2013 | Miao ...................... G06F 3/011 345/633 |
| 2014/0198096 | A1* | 7/2014 | Mitchell ................ G06F 3/147 345/419 |

OTHER PUBLICATIONS

Canadian Office Action dated Apr. 28, 2016 for Canadian Patent Application No. 2,886,930, 5 Pages.
Canadian Office Action dated Mar. 31, 2017 for Canadian Patent Application No. 2886930, 8 pages.
Vincent Lepetit et al, Fully Automated and Stable Registration for Augmented Reality Applications, Swiss Federal Institute of Technology, 2003, 10 pages.
Luca Vacchetti, et al, Fusing Online and Offline Information for Stable 3D Tracking in Real-Time, Swiss Federal Institute of Technology, 2003, 8 pages.

* cited by examiner

AUGMENTED REALITY APPEARANCE ENHANCEMENT

CROSS REFERENCE TO RELATED APPLICATION

This application claims priority to U.S. Provisional Patent Application No. 61/973,736, entitled "Augmented Reality Appearance Enhancement," filed Apr. 1, 2014, the entirety of which is hereby incorporated by reference.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed Description section below. This summary is not intended to identify key features or essential features of the claimed subject matter, nor is it intended to be used as an aid in isolation to determine the scope of the claimed subject matter.

In brief and at a high level, this disclosure describes, among other things, systems and methods for altering appearance of acquaintances with smart glasses, which may be altered using augmented reality technology. In particular, an embodiment of the invention is directed to allowing users to alter their physical appearance to others when viewed by others wearing smart glasses. In various embodiments, the others viewing the user through smart glasses include friends, family, contacts, or other acquaintances of the user, such as may be specified in one or more social networks or contacts databases, and the user's altered appearance is based on the particular relationship between the user and the viewer. For example, a user may appear as a particular superhero to his friends on the Facebook social network, as having a cartoon feature (such as an enormous head) to his children, as normal to his mother and business contacts, and as wearing a Hawaiian shirt to his closest buddies. In an embodiment, the user specifies his or her altered appearance for various sets of friends and acquaintances, which is then saved in one or more appearance profiles. In some embodiments, the smart glasses run an app for presenting the altered appearances. In an embodiment, the app accesses a social network, contacts database, or objects database for facilitating identifying a person or object viewed with the smart glasses; accesses an appearance profile for the identified person or object; determines a relationship between the viewer and the person or object; and renders an augmented appearance for the person or object as specified based on the relationship.

In one embodiment of the present invention, a method for altering the appearance of a second person, when viewed through smart glasses worn by a first person, is provided. The method identifies the second person. The second person may be identified using information from one or more social networks or databases. The method further includes accessing more profiles information associated with the identified second person and determining augmented appearance conditions for the second person, based on the profiles information. The profiles information can include conditions for altering appearances of the user based on relationships with the second person, and may include (or point to) information used for altering the appearance. Finally, based on the determined augmented appearance conditions, an augmented appearance is rendered and applied to the second person.

BRIEF DESCRIPTION OF THE DRAWINGS

Illustrative embodiments of the invention are described in detail below with reference to the attached drawing figures, and wherein.

DETAILED DESCRIPTION OF THE INVENTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

As one skilled in the art will appreciate, embodiments of the invention may be embodied as, among other things: a method, system, or set of instructions embodied on one or more computer-readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer-readable media.

Computer-readable media include both volatile and nonvolatile media, removable and non-removable media, and contemplate media readable by a database, a switch, and various other network devices. By way of example, and not limitation, computer-readable media comprise media implemented in any method or technology for storing information, including computer storage media and communications media. Examples of stored information include computer-useable instructions, data structures, program modules, and other data representations. Computer storage media examples include, but are not limited to, information-delivery media, RAM, ROM, EEPROM, flash memory or other memory technology, CD-ROM, digital versatile discs (DVDs), holographic media or other optical disc storage, magnetic cassettes, magnetic tape, magnetic disc storage, other magnetic storage devices, and other storage devices. These technologies can store data momentarily, temporarily, or permanently.

Embodiments of the invention are directed to methods, systems, and computer-readable media for altering the appearance of a user's acquaintances with smart glasses, which may be altered using augmented reality technology. People alter their appearance daily using physical means, such as by using make-up, hairstyling, hair dyeing, clothing, and accessories. Others choose to alter their appearance through tanning, dyeing their skin, and tattoos. All of these physical methods are limited in how much they can alter an appearance. Some are costly and others are permanent in nature. Accordingly, in one example embodiment, a software application allows a user to decorate themselves with artifacts that change their appearance when others view them through augmented reality glasses or smart glasses. The user is able to specify how they appear to others and will view others according to how others have defined their appearance. In an embodiment, using augmented reality coupled with the use of wearable vision devices such as smart glasses, people can alter and preview their appearance in real time and/or create an augmented appearance for others to view.

In particular, an embodiment of the invention is directed to facilitating a user to alter his or her physical appearance to others when viewed by others wearing smart glasses. In various embodiments, the others viewing the user through smart glasses include, by way of example only and not limitation, friends, family, contacts, selected friends, or other acquaintances of the user, such as may be specified in one or more social networks, contacts databases, or objects databases. A user's appearance may be altered or augmented as specified based on the particular relationship between the user and the viewer. For example, a user may determine he wants to appear as a particular superhero to his friends on the Facebook social network, as having a cartoon feature (such as an enormous head) to his children, as normal to his mother and business contacts, and as wearing a Hawaiian shirt to his closest buddies. In an embodiment, the user specifies his or her altered appearance for various sets of friends and acquaintances. The user's appearance preferences and conditions may be saved in one or more appearance profiles associated with the user. In some embodiments, the smart glasses operate with a software application (or app) that facilitates presenting the altered appearances. For example, in an embodiment, the app accesses a social network, contacts database, or objects database for information to identify a person or object viewed with the smart glasses. For example, a pattern or facial recognition routine may be used to identify objects or persons viewed through the smart glasses. The app then accesses an appearances profile for the identified person or object, determines a relationship between the viewer and person or object, and renders an augmented appearance for the person or object as specified based on the relationship or other conditions in the appearances profile. In an embodiment, objects can include pets, cars, houses, accessories (e.g., purses, watches, objects carried by or used by someone), and other physical or virtual objects, including natural and manmade objects, capable of being viewed through smart glasses.

A further aspect of some embodiments of the invention is the capability of a user to specify his or her appearance to his or her various social contacts. By way of example and not limitation, a user may specify his appearance to his various social contacts or types of social contacts, such as his family, close friends, work contacts, and the like. In an embodiment, a user is presented a user interface for facilitating the determining of their altered appearance for one or more social contacts or types of social contacts. For example, a user wearing smart glasses may look into a mirror to see their reflection and using the user interfaces, may select, design, or otherwise specify their appearance alteration for one or more of the user's social contacts or types of social contacts. The user is thus able to view how they will appear to each of these social contacts or types of contacts.

Figure 1A:
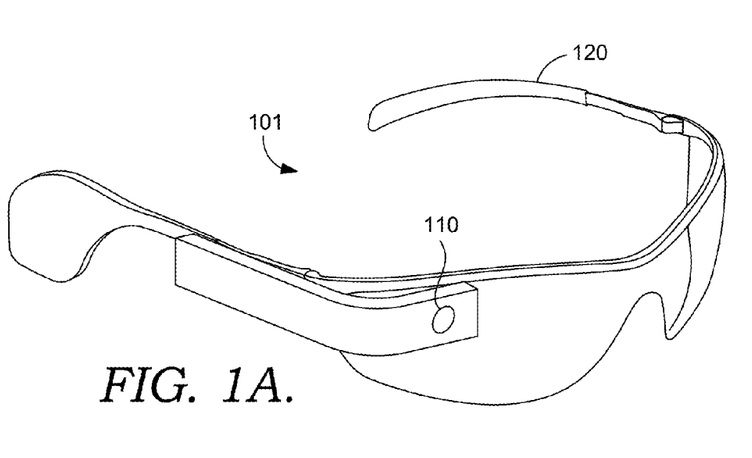
FIGS. 1A-1D illustratively depict aspects of a wearable vision device (smart glasses) suitable for use with embodiments of the present invention.
Figure 1B:
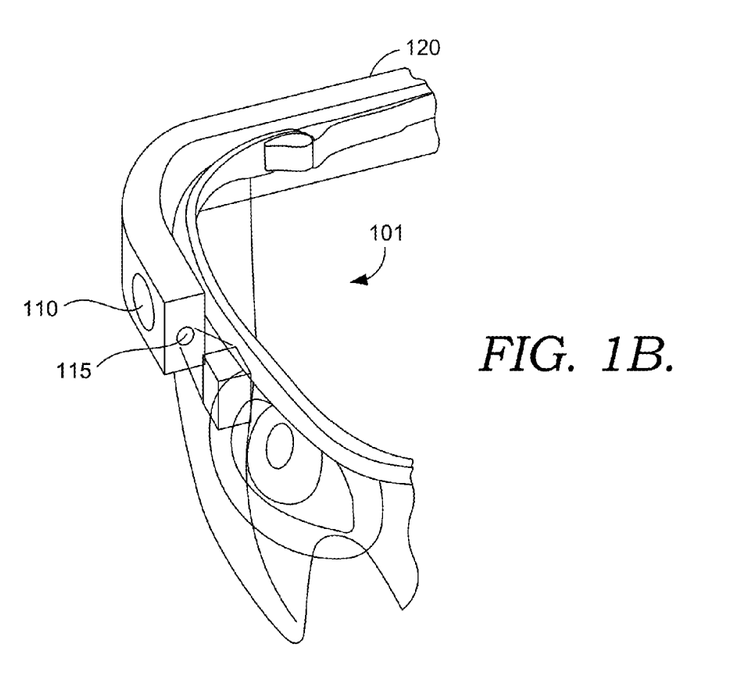
Figure 1C:
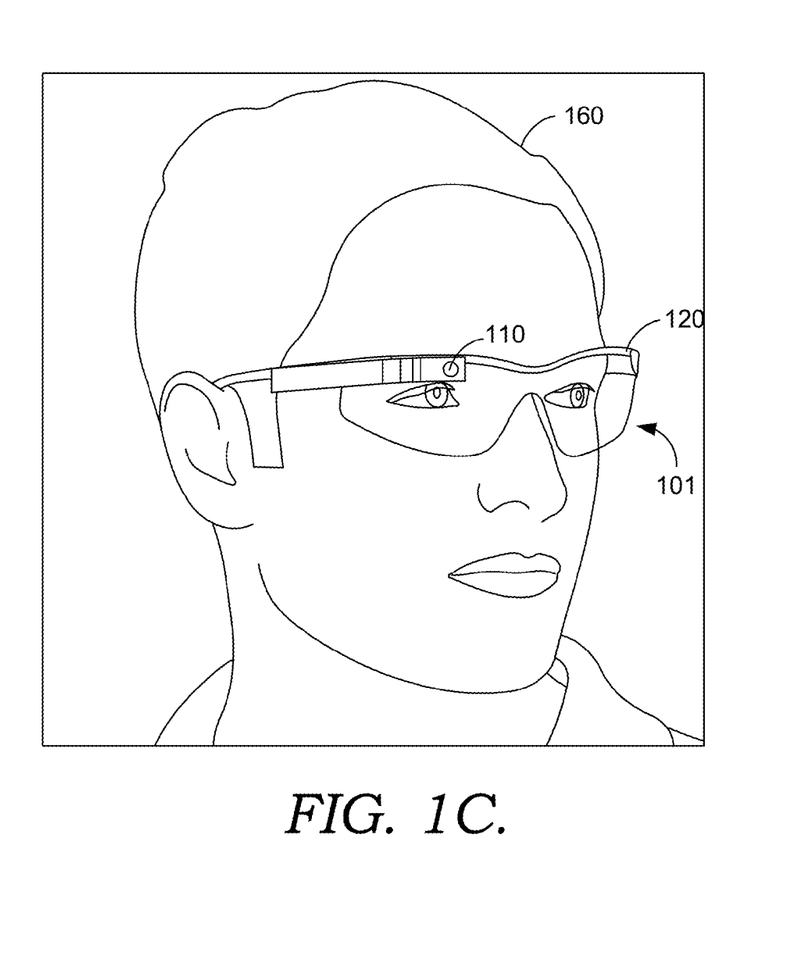

With reference to FIGS. 1A-1C, aspects of one example of a wearable vision device (e.g., smart glasses) are illustratively provided and referred to generally herein as smart glasses 101. In various embodiments, smart glasses 101 may be embodied as a wearable computer with an optical-head-mounted display, transparent heads-up display, virtual retinal display or other display capable of providing augmented reality overlay and digital images as well as allowing the user to see portions of their surrounding environment. One embodiment of smart glasses 101 uses Google Glass manufactured by Google, Inc.

The example embodiment of smart glasses 101 shown in FIGS. 1A-1C includes a frame 120 configured to be wearable on the head of a user 160 and to support a camera 110 and display component 115. Smart glasses 101 include camera 110 configured to capture visual information about objects or persons viewed using smart glasses 101, and display component 115 for displaying digital images, such as user interface features, menus, application information, or metadata associated with real objects viewed by the user-wearer and for providing augmented reality overlay onto objects viewed by the user-wearer, such as an altered appearance. Smart glasses 101 may also include other components such as a computer and a power supply, which are described in FIG. 1E, and a communications component for communicating over a network (such as the Internet), as described in connection to FIG. 2. As used herein, the terms "smart glasses" and "wearable vision device" are used synonymously. Further, it is contemplated that these terms include embodiments implemented using smart contact lenses, direct retinal projection, heads-up type display systems, or any display system capable of providing augmented reality imagery.

Figure 1D:
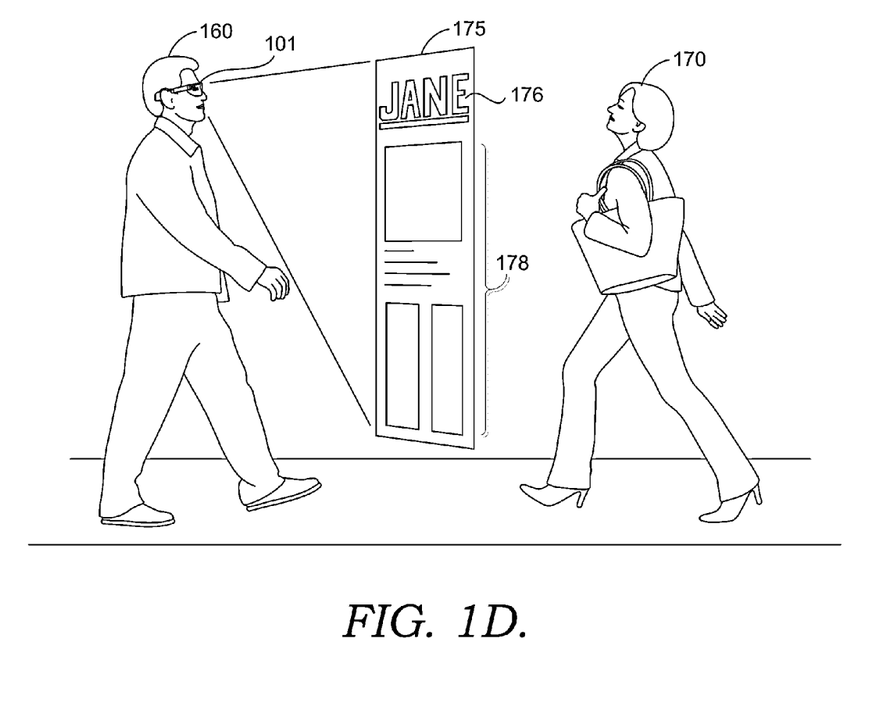

With reference to FIG. 1D, an example operating environment and application using smart glasses 101 is illustratively provided. As shown in FIG. 1D, user 160 wearing smart glasses 101 views a person or object 170 (here a person 170 walking towards user 160). Smart glasses 101 detect the identity of person 170 and display to user 160 metadata 175 about person 170. Metadata 175 includes information about person 170, such as name 176 (here "Jane") and other details 178 about Jane, such as birthday, pictures, or other similar information. Although FIG. 1D shows metadata 175, it would only be visible to user 160 because it is projected by smart glasses 101. Further, display component 115 (not shown) displays metadata 175 as an augmented reality overlay onto or near the objects already visible to user 160, such as person 170.

Figure 1E:
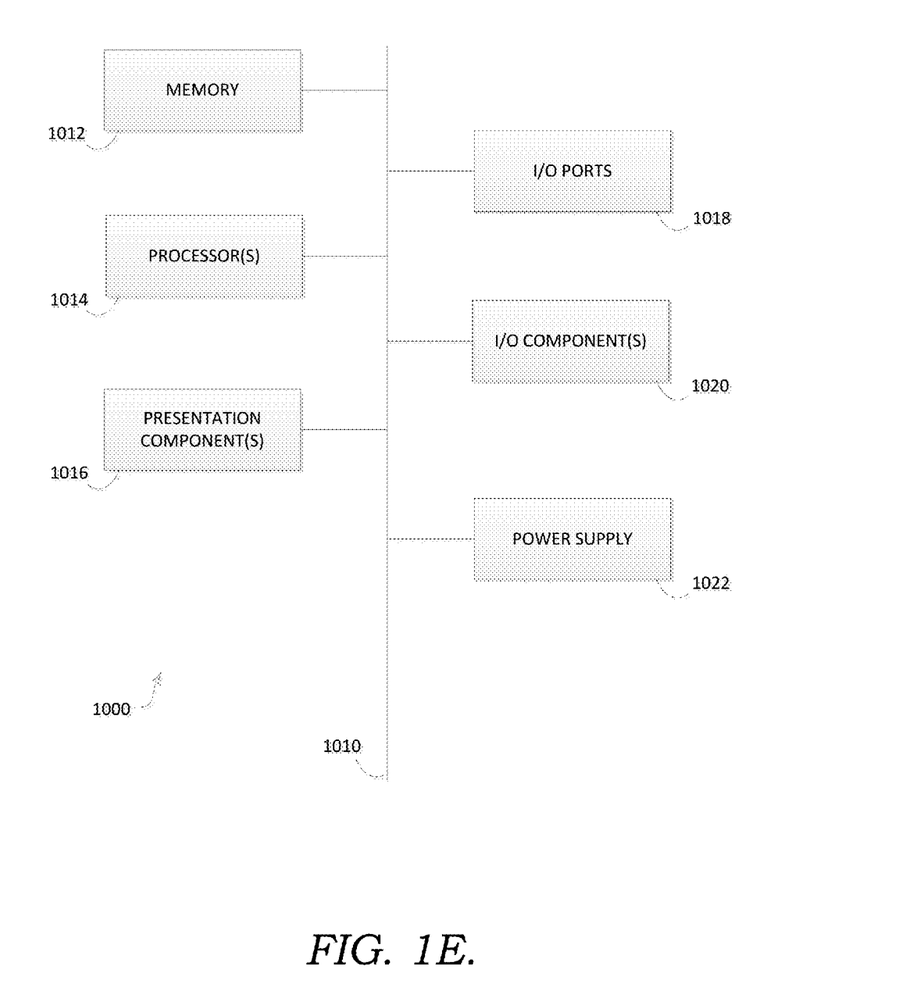
FIG. 1E depicts an illustrative representation showing logical connections among components of an example wearable vision device, in accordance with embodiments of the present invention.

Turning now to FIG. 1E, an exemplary operating environment showing logical connections among components of one embodiment of a wearable vision device is shown and designated generally as computing device 1000. Computing device 1000 is but one example of a suitable computing environment and is not intended to suggest any limitation as to the scope of use or functionality of embodiments of the present invention. Neither should the computing device 1000 be interpreted as having any dependency or requirement relating to any one or combination of components illustrated.

Some embodiments of the present invention may be described in the general context of computer code or machine-useable instructions, including computer-executable instructions, such as program components, being executed by a computer or other machine, such as a personal data assistant or other handheld device. Generally, program components including routines, programs, objects, components, data structures, and the like refer to code that performs particular tasks or implements particular abstract data types. Some embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1E, computing device 1000 includes a bus 1010 that logically couples the following components: memory 1012, one or more processors 1014, one or more presentation components 1016, one or more I/O ports 1018, I/O components 1020, and an illustrative power supply 1022. Bus 1010 represents what may be one or more busses (such as an address bus, data bus, or combination thereof). Although the various blocks of FIG. 1E are shown with lines for the sake of clarity, in reality, delineating various components is not so clear and, metaphorically, the lines would more accurately be grey and fuzzy. For example, one may consider a presentation component such as a display device to be an I/O component. Also, memory component 1012 may include memory located in smart glasses 101, memory used for database 230 (described in FIG. 2), and/or other computer system memory. Also, processors have memory. The inventors hereof recognize that such is the nature of the art and reiterate that the diagram of FIG. 1E is merely illustrative of an exemplary computing device that can be used in connection with one or more embodiments of the present invention. Distinction is not made between such categories as "workstation," "server," "laptop," "handheld device," "wearable device," "mobile device," etc., as all are contemplated within the scope of FIG. 1E and with reference to "computer" or "computing device."

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors 1014 that read data from various entities such as memory 1012 or I/O components 1020. Presentation component(s) 1016 present data indications to a user or other device. Exemplary presentation components include a display device such as display component 115, speaker, printing component, vibrating component, etc. I/O ports 1018 allow computing device 1000 to be logically coupled to other devices including I/O components 1020, some of which may be built-in. Illustrative I/O components include a button(s), camera(s), microphone(s), eye-movement detection, touch interface, joystick, game pad, satellite dish, scanner, printer, wireless device, etc., and may be built in or external.

Figure 2:
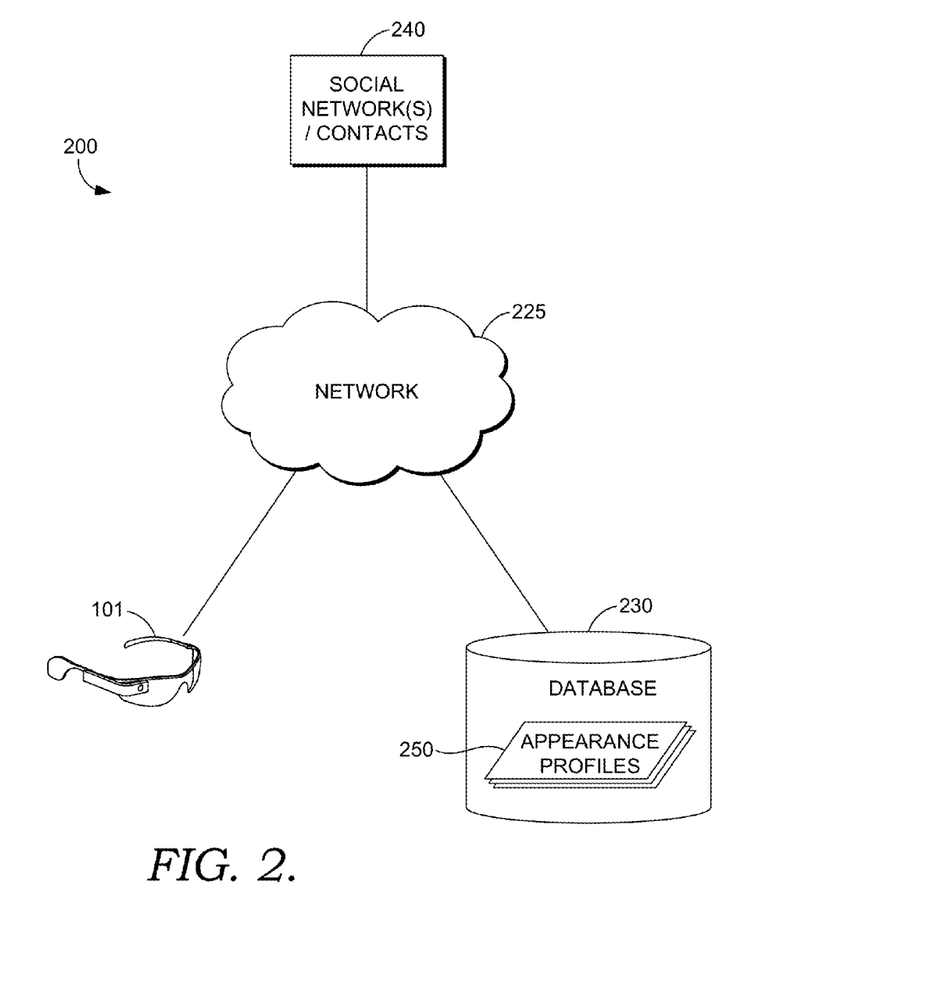
FIG. 2 illustratively depicts aspects of an example operating environment suitable for using an embodiment of the present invention.

Turning now to FIG. 2, a block diagram is illustrated, in accordance with an embodiment of the present invention, showing an operating environment 200 suitable for using an embodiment of the present invention. It will be understood and appreciated that operating environment 200 shown in FIG. 2 is merely an example of one suitable operating environment and is not intended to suggest any limitation as to the scope of use or functionality of embodiments of the present invention. For instance, operating environment 200 may use a network 225 that is public, private, or dedicated, and may use distributed or cloud-based computing. Neither should the operating environment 200 be interpreted as having any dependency or requirement related to any single component or combination of components illustrated therein. Further, although the various blocks or components of FIG. 2 are shown with lines for the sake of clarity, in reality, delineating various components is not so clear, and metaphorically, the lines would more accurately be grey and fuzzy. In addition, any number of physical machines, virtual machines, data centers, endpoints, or combinations thereof may be employed to achieve the desired functionality within the scope of embodiments of the present invention.

Operating environment 200 includes one or more smart glasses 101, such as described in connection to FIGS. 1A-1E. In various embodiments, smart glasses 101 include one or more processors (not shown), such as processor(s) 1014 described in FIG. 1E, which run one or more software applications or apps (not shown) that facilitate identifying one or more objects, determining their relationship with the user-wearer, and rendering the altered appearances for the objects for display to the user-wearer via the smart glasses 101. Smart glasses 101 are communicatively coupled to a network 225 which is communicatively coupled to database 230 and social network(s)/contacts component 240.

Network 225 may include, without limitation, one or more local area networks (LANs) and/or wide area networks (WANs), which may comprise the Internet, one or more public networks, private networks, and/or one or more other communications networks, such as a cellular network or similar network(s) for facilitating communication among devices connected through the network. Network 225 may be determined based on factors such as the source and destination of the information communicated over network 225, the path between the source and destination, or the nature of the information. For example, intra-organization or internal communication may use a private network or virtual private network (VPN). Moreover, in some embodiments, items shown communicatively coupled to network 225 may be directly communicatively coupled to other items shown communicatively coupled to network 225.

Example operating environment 200 also includes database 230, which may be embodied as a distributed database (or set of databases), or stored information across one or more datastores, which may be located in smart glasses 101, a server or computer, networked storage, or cloud-based storage. Accordingly, although depicted as a single database, database 230 may comprise one or more databases, and further may be in the cloud.

Database 230 includes one or more appearance profiles 250. Appearance profiles 250 include information specifying appearance preferences and conditions for applying appearances to objects identified by smart glasses 101. In an embodiment, appearance profiles 250 include one or more appearance-information settings or sets used for facilitating altering the appearance of a person or object. In an embodiment, appearance profiles 250 may include the information used for rendering the altered or augmented appearances, such as graphics information, or may include an address or pointer to locations (e.g., local, remote, or cloud-based storage locations) containing such graphics information. In an embodiment, appearance profiles 250 further include conditions-settings including, for example, relationship conditions between the user-wearer and the person or objected whose appearance is altered and/or other conditions for determining which altered appearances should be applied, how the altered appearances should be applied or modified, and when the appearances are applied. By way of example and not limitation, database 230 may include appearance profiles 250 including a first appearance profile for close friends that specifies a superhero, a second appearance profile for family that specifies a humorous enormous cartoon head but only until a time that the children are to go to sleep (e.g., 8:30 pm), a third appearance profile for business clients that specifies a company logo to appear on the chest, and a fourth appearance profile for all friends and family that specifies a favorite team mascot during a day that the team plays. Accordingly, in the preceding example, database 230 includes appearance profiles that include relationship condition-settings that specify particular altered appearances for various relationships (e.g., (1) close friends, (2) family, (3) business clients, and (4) all friends and family) between the user-wearer and person or object whose appearance is to be altered. The preceding example also includes examples of condition-settings specifying a limited time that a person or object appears with humorous enormous cartoon head to his family (until 8:30 pm) and condition-settings specifying that for a particular date (a game day) the user is to appear to all of their friends and family as a team mascot. In some embodiments, the condition-settings can be prioritized. So for the preceding example, on game day before 8:30 pm, the user would appear as a mascot rather than with an enormous cartoon head.

Figure 5:
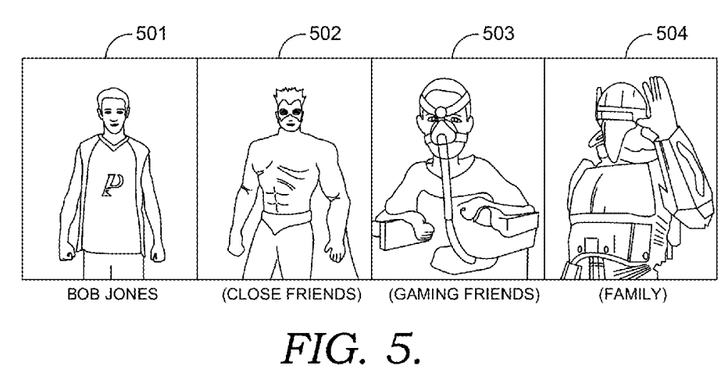
FIG. 5 illustratively depicts examples of altered appearances for a user, based on appearance profiles, in accordance with an embodiment of the invention.

By way of example and not limitation, FIG. 5 depicts example augmented appearances, which may be contained in appearance profiles 250 for a person named Bob Jones. Box 501 of FIG. 5 shows an image of Bob Jones. Boxes 502, 503, and 504 show various augmented appearances for Bob Jones based on relationship conditions. In particular, box 502 shows how Bob Jones is to appear to his close friends; box 503 shows how he is to appear to his gaming friends; and box 504 shows how he is to appear to his family. Accordingly, in an example embodiment, suppose a user wearing smart glasses 101 viewed Bob Jones. An app running on the smart glasses 101, accesses social network(s)/contacts component 240 (described below) and identifies Bob Jones and determines that Bob Jones is a close friend. The app then accesses an associated appearance profile and determines that Bob Jones has specified that his close friends are to view him, as shown in box 502, as a superhero.

Returning to appearance profiles 250 of FIG. 2, in some embodiments, condition-settings can specify how an object or person is to appear to a specified person, rather than based on a relationship between the user-wearer and person or object. For example, an appearance profile that specifies that a person should always be presented without any augmented appearance when the user-wearer is mom; or that John Smith should always appear as a particular movie character when viewed by his best friend Sam Jones. In some embodiments, a user-wearer determines his or her augmented appearance(s) to his or her social contacts and corresponding condition-settings, which are then stored in one or more appearance profiles 250, as further discussed with reference to FIG. 3B.

In some embodiments, the user can also determine how persons or objects are presented to him or herself or others in their social contacts. For example, a dad can specify that the family dog should appear with an enormous cartoon tail when viewed by other members of the family, or a mom can specify that the family's house appears to move and have fangs on Halloween when viewed by the children and their friends. A school bus driver could specify that his or her school bus appears with a smiling face and a particular color when viewed by the children that are supposed to ride that bus. Such appearances and condition-settings are then stored in one or more appearance profiles 250.

Example operating environment 200 also includes a social network(s)/contacts component 240, which may be embodied as a social network site (such as Facebook or Twitter) or a contacts database (such as email contacts) associated with the user-wearer of smart glasses 101. In some embodiments, social network(s)/contacts component 240 is embodied as a server, website, database, or program running locally, remotely, or in the cloud that includes information regarding relationships between the user-wearer and other entities (objects, people, or groups of people) on the social network(s)/contracts component 240. For example only and not as a limitation, social network(s)/contacts component 240 may include information specifying those persons (or objects) that are a user-wearer's close friends, family, clients, selected friends, spouse, business contacts, friend groups, other acquaintances, pets, cars or homes, and the like. In some embodiments, social network(s)/contacts component 240 further includes identification functionality or identification information for facilitating identification by an application running on smart glasses 101 of persons or objects for which appearances are to be altered when viewed through smart glasses 101. For example, in an embodiment the identification information may be used by a pattern recognition or facial recognition routine to identify objects or persons viewed through the smart glasses 101.

In some embodiments, an application or app running on smart glasses 101 accesses the information in social network(s)/contacts component 240 over network 225 to facilitate determining the identity of an object or person viewed through smart glasses 101 and then the relationship of the identified person or object to the user-wearer of the smart glasses 101. In some embodiments, an application or app running on social networks/contacts component 240 provides such information over network 225 to smart glasses 101. In some embodiments social network(s)/contacts component 240 includes database 230.

Figure 3A:
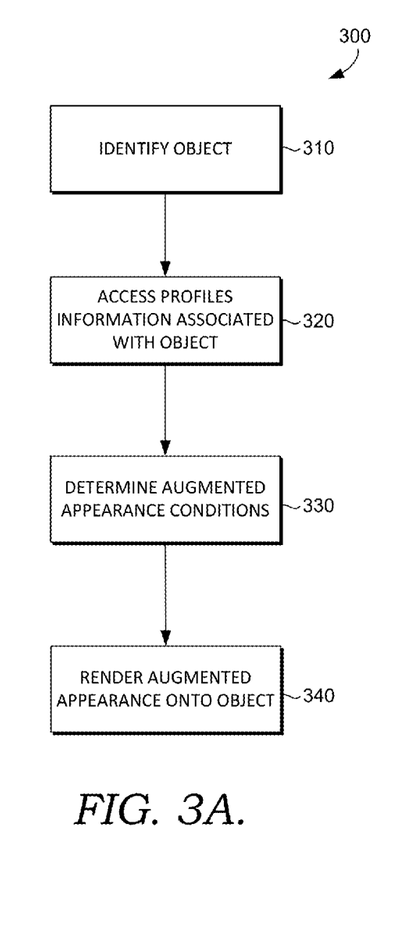
FIG. 3A is a flow diagram of a method for altering the appearance of an object, when viewed through smart glasses, in accordance with an embodiment of the invention.

Turning now to FIG. 3A, a flow diagram of a method for altering the appearance of an object, when viewed through smart glasses, is provided and referred to generally herein as method 300. At a step 310, an object (which may include a person) viewed through the smart glasses is identified. In an embodiment, a software application or app running on smart glasses accesses a social network, contacts database, or objects database, such as social network(s)/contacts component 240 of FIG. 2, for information to identify a person or object viewed with the smart glasses. For example, a pattern or facial recognition routine may be used to identify objects or persons viewed through the smart glasses. Once the object (which may be a person) is identified, at step 320, profiles information associated with the object is accessed. In an embodiment, one or more appearance profiles 250 associated with the identified object or including information for augmenting the appearance of the object, are accessed and used to determine appearance conditions associated with the identified object. In an embodiment, appearance profiles reside in a database such as database 230 described in FIG. 2.

At a step 330, method 300 determines augmented appearance conditions based on the profiles information associated with the object. In an embodiment, appearance conditions are specified by one or more appearance profiles, such as appearance profiles 250 described in connection to FIG. 2. In an embodiment, condition-settings include relationship-settings between the identified object and the user-wearer. Accordingly, in an embodiment, step 330 determines appearance conditions or how the identified object should appear to the user-wearer, based on the relationship between the object and user-wearer and/or other conditions (such as time constraints like the examples discussed above in connection with FIG. 2). FIG. 5 illustratively provides an example of appearances for an object (here, a person named Bob Jones), that includes relationship conditions specifying how Bob Jones is to appear to viewers based on their relationship to Bob Jones.

Returning to FIG. 3A, at a step 340, an augmented or altered appearance is rendered and applied onto the object. In an embodiment, appearance profiles 250 include the information used for rendering the altered or augmented appearances, such as graphics information (e.g., graphics images, templates, animations, motion paths, or other graphics information), or may include an address or pointer to locations (e.g., local, remote, or cloud-based storage locations) containing such graphics information. In an embodiment, all appearance alterations of the object (such as movement of the object including rotation, skew, distance from the user-wearer, and the like, including movement of the object relative to the user-wearer who might be the one moving) are tracked and synchronized so that the augmented or altered appearance is presented proportionally and consistently based on the relative position of the object to the user-viewer.

Figure 6:
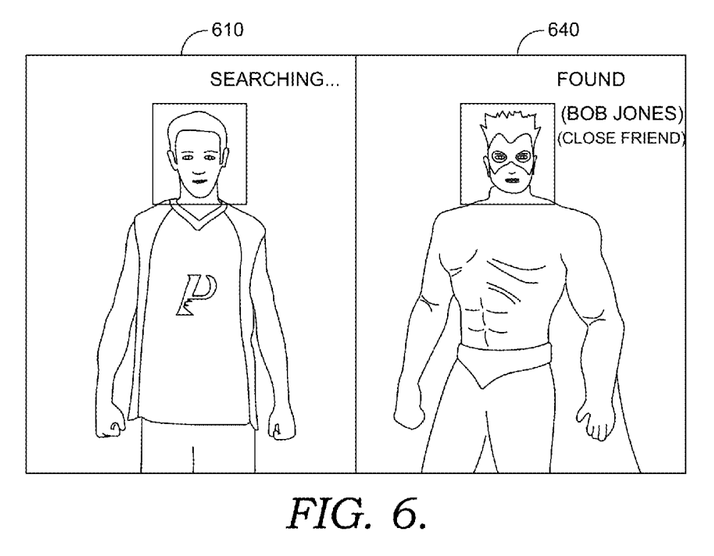
FIG. 6 illustratively depicts an example associated with the method of FIG. 3A of identifying an object and applying an augmented appearance onto the identified object based on an appearance profile, in accordance with an embodiment of the invention.

FIG. 6 illustratively provides aspects of method 300. At a high level, in an embodiment, as a user-wearer views a person or object, an application running on his or her smart glasses 101 accesses social media or a database (such as component 240 of FIG. 2) to identify the person or object and relationship to the person or object. The application then determines augmented appearance conditions for the object, which may be determined by one or more appearance profiles 250. In an embodiment, if the object or person is identified, an augmented appearance is transmitted to smart glasses 101 (or accessed via the app running on smart glasses 101) and subsequently rendered and overlaid onto the object or person. In an embodiment, a small "picture-in-picture" image is provided to the user-wearer to see how he or she appears to others, based on his or her relationship (or other condition-settings) to the other viewer.

As shown in box 610, an object (here, an as-of-yet unidentified Bob Jones) is shown and represents what is viewed through smart glasses 101. Box 610 corresponds to step 310 of method 300, prior to identifying the object. Box 640 shows Bob Jones with augmented appearance (here, as a superhero). Box 640 also indicates that the object (Bob Jones) is identified as Bob Jones and is a close friend. It is contemplated that some embodiments do not necessarily display Bob Jones' name nor the relationship as shown in box 640. Box 640 corresponds to steps 310 through 340 of method 300.

Figure 3B:
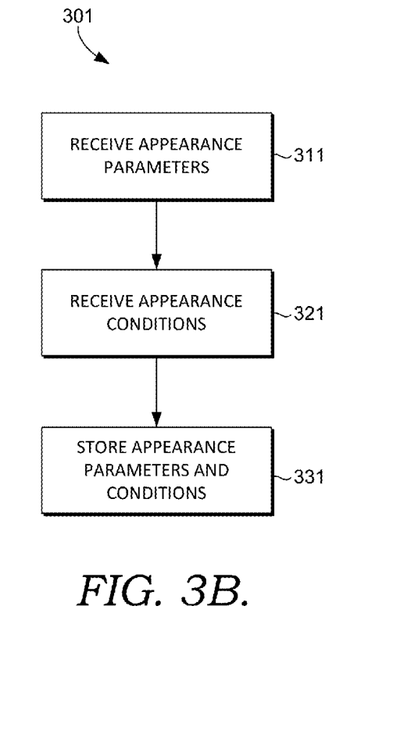
FIG. 3B is a flow diagram of a method for creating an altered appearance of a person or object to be displayed when viewed through smart glasses, based on one or more conditions, in accordance with an embodiment of the invention.

Turning now to FIG. 3B, a flow diagram is provided of a method for creating an altered appearance of a person or object to be displayed when viewed through smart glasses, based on one or more conditions, and referred to generally as method 301. In an embodiment, a person wearing smart glasses 101 applies method 301 to determine conditions specifying how he or she (or in some embodiments how $3^{rd}$ parties or objects) will appear to their various social contacts. At a step 311, appearance parameters are received. In an embodiment, a user specifies appearance parameters using a user interface, such as a graphical user interface (e.g., a menu), hand gestures, and/or speech recognition, for example. In an embodiment, appearance parameters include information specifying how the user (or $3^{rd}$ party or object) is to appear and may also include graphics information and information relating to rendering augmented appearances (such as size/proportion information, color(s), animation, or the like). For example, as shown in FIG. 5, appearance parameters may be used to provide graphics information for the augmented appearances shown in boxes 502, 503, and 504.

At a step 321, appearance conditions are received. In an embodiment, a user specifies appearance conditions using a similar user interface as described in step 311. In an embodiment, appearance conditions may include information specifying one or more relationship conditions between the user (or a $3^{rd}$ party or object) and the user's social contacts for which to display an augmented appearance based on the appearance parameters received in step 311. In an embodiment appearance conditions may include other conditions, such as time constraints (e.g., altering the appearance to be a team mascot but only on game day) for displaying an augmented appearance based on the appearance parameters received in step 311.

At a step 331, the received appearance parameters and conditions are stored. In an embodiment, these parameters and conditions are stored in one or more appearance profiles 250, which may reside in database 230 or a social network, such as social network(s)/contacts component 240.

Figure 4A:
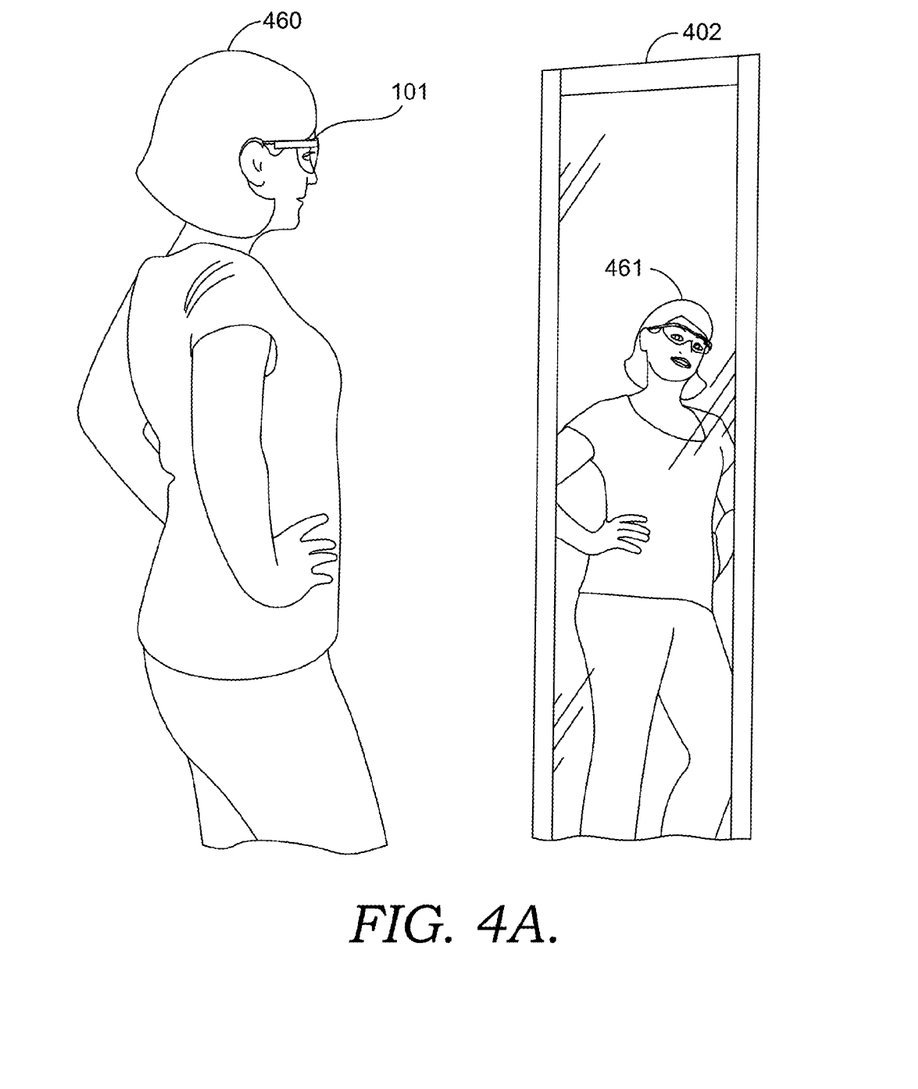
FIG. 4A illustratively depicts an aspect of an example operating environment suitable for using an embodiment of the present invention.
Figure 4B:
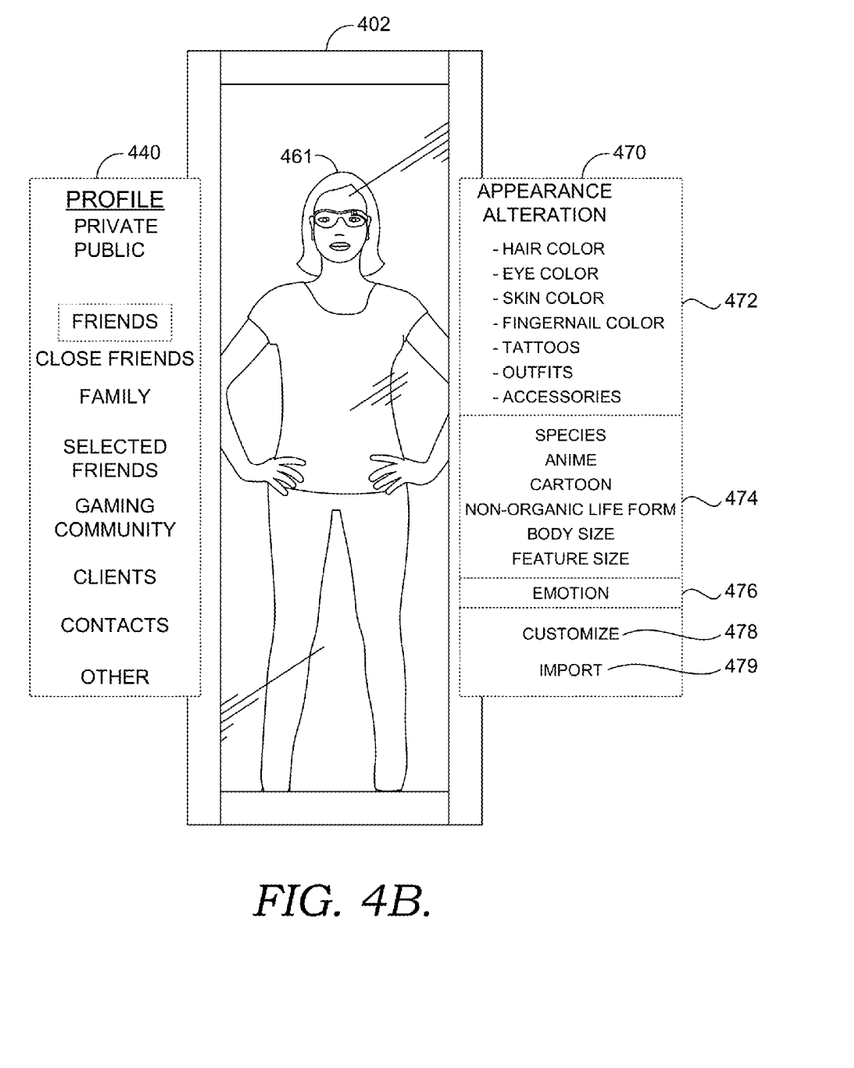
FIG. 4B illustratively depicts aspects of user interfaces for creating an altered appearance profile, in accordance with an embodiment of the invention.

FIGS. 4A and 4B depict aspects of method 301. With reference to FIG. 4A, at a high level and in an embodiment, a user 460 wearing smart glasses 101 stands before a mirror 402 and sees her reflection 461 in the mirror 402. With reference to FIG. 4B, the user may be presented with one or more user interfaces, such as menus 440 and 470, which may be used for determining the user's augmented appearance(s) when viewed by one or more social-contacts profiles. The user navigates menus 440 and 470 via hand gestures, by speaking, eye motion (such as looking at a particular menu item) or some other I/O component.

Menu 440 comprises a profile settings menu and includes menu items relating to a user's various social-contacts groups. For example, menu 440 includes friends, close friends, family, selected friends, gaming community, clients, contacts, and other. Additionally, menu 440 includes a "private" option and a "public" option, which may be selected for specifying a user's public profile (e.g., how the user may appear to everyone else outside of the user's social contacts) or private profile (how the user appears to designated social-contact groups or only to the user).

Menu 470 comprises an appearance settings menu and includes menu items relating to altering the user's appearance. For example, menu 470 includes basic attributes 472, such as hair color, eye color, skin color, fingernail color, tattoos, outfits, and accessories (e.g., belts, glasses, hats, jewelry, scarves, watches, and the like). Example menu 470 also includes other appearance options 474, such as species (e.g., human, Klingon or other alien, dog, lizard, ape, fish, or other species), anime, cartoon, non-organic life form, body size, and feature size (e.g., head, eyes, arms, or other body feature size). Example menu 470 also includes emotion appearance 476, which applies an emotion (e.g., happy, sad, or other emotion) to the altered appearance selected by the user; a customize appearance menu item 478, which may be used for customizing (such as altering or changing visual attributes (e.g., color, size, number of horns, etc.)) or adding or deleting aspects of other appearance items determined in menu 470; and an import appearance information item 479, which may be used to import additional appearance settings into menu 470 (such as new menu items or options), for example, new species or new basic attributes.

Using menus 440 and 470, a user specifies his or her appearance for each of the social-contacts groups (including public or private) that the user wishes to specify an appearance. In this example embodiment, the user-determined specifications are then saved to one or more appearance profiles 250 associated with the user. A user may also use menus 440 and 470 to specify other conditions for altered appearance (such as time constraints). These conditions are also stored in appearance profiles 250. In an embodiment, the user views the altered appearance overlaid onto their reflection 461, for a particular social-contacts profile, as the user is specifying their altered appearance and conditions for the altered appearance. In an embodiment, the user can make changes to the altered appearance in real time and view the changes in real time. For example, the user may select a cartoon head and then change the head size (feature size) in small increments until they are satisfied with the size.

In some embodiments, the user may specify appearances for a $3^{rd}$ party or objects (such as via the "other" item in menu 440). In such embodiments, this appearance information is saved in one or more appearance profiles 250 associated with the $3^{rd}$ party or object or associated with the user and the $3^{rd}$ party or object. Thus for example, a father may specify an altered appearance (using menu 470) of the family dog (an object) when viewed by his family (a social-contacts group in menu 440). The father's specifications may be saved in an appearance profile 250 associated with the dog. In an embodiment, information about the father's specifications may also be saved in social network(s)/contacts component 240, such as specifying a relationship between the object and the social contacts of the father (e.g., his family). Thus, in an embodiment, upon identification of the dog (object) and determination of a relationship with the dog (object), such as based on information in social media or social network(s)/contacts component 240, another family member viewing the dog (object) will be presented an augmented appearance of the dog (object) based on that relationship. Here, because the other family member viewing the dog (object) is determined to have a relationship satisfied by a relationship condition set by the father (e.g., the condition that the other family member is a member of the father's family, or that the dog (identified object) is associated with members of the family because it is the family dog), the appearance of the dog is altered according to the appearance settings specified by the father, which may be included in an appearance profile 250.

Many variations can be made to the illustrated embodiments of the present invention without departing from the scope of the present invention. Such modifications are within the scope of the present invention. For example, in one scenario, a user stands in front of a mirror wearing smart glasses 101, which overlays onto the user's vision of their reflection in the mirror a variety of menu choices to alter how the user will be viewed by others wearing smart glasses. The user may select from the menu options using hand and voice gestures. Choices include but are not limited to conventional appearance alterations: skin color, hair color, eye color, fingernail color, tattoos, outfits and accessories. Choices may also include unconventional, "avatar-like" appearance alterations including: species, anime, cartoons, non-organic life forms, and body size. Further, all appearance alterations are linked to the wearer and are synchronized with the wearer's movements.

Further, the user may select several different appearances and profiles. They can assign public and private appearances based on who might be viewing them. For example, the user can set a "public appearance" that anyone who is outside his friends list will see him as a blue lion with yellow eyes. He may set a "private appearance" for his friends to view him as a chrome humanoid with one eye. As others wearing smart glasses view him, they connect to social media to identify him. If he is a friend, his private appearance will be transmitted to overlay him. If he cannot be identified via social media or is not a friend, a default site may transmit his public appearance to those viewing him. Conversely, he may view the altered appearance of the person viewing him. In a small projected "picture-in-picture" type image, he may see how the other person views him. He can change his assigned appearance at any time using voice or hand gestures, for example.

As another example, embodiments of the invention may be used for emotion display. For example, users can alter their appearance to project their emotion either by including visual cues on themselves or the frame that surrounds them; environment, for example, users can frame themselves in a custom environment, such as a favorite place like Hawaii, the top of Mt. Everest, or some fanciful location like Smurf Village; gaming, for example, users can dress in their favorite role playing attire and interact with others they meet (e.g., knights in armor with virtual swords for fighting).

From the foregoing it will be seen that this invention is one well adapted to attain all ends and objects hereinabove set forth together with the other advantages, which are clear following the complete disclosure above and which are inherent to the methods and apparatuses described herein. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

The invention claimed is:

1. One or more non-transitory computer-storage media having computer-executable instructions embodied thereon that, when executed by one or more computing devices, perform a method of altering the appearance of a user, when the user is viewed by an observer through a first wearable vision device, the method comprising:

accessing a database including information associated with the observer and profile information associated with the observer;

identifying the observer based on the accessed information;

determining one or more augmented appearances associated with the observer, based on the identification and the accessed information; and rendering a picture-in-picture image on a second wearable vision device representing how the user appears to the observer with at least one augmented appearance of the one or more augmented appearances applied to the user.

2. The one or more non-transitory computer-storage media of claim 1, wherein at least one of the first wearable vision device and the second wearable vision device is a wearable computer with a display capable of providing an augmented reality overlay and portions of a surrounding environment.

3. The one or more non-transitory computer-storage media of claim 1, wherein a software application on at least one of the first wearable vision device and the second wearable vision device accesses the database to identify the object.

4. The one or more non-transitory computer-storage media of claim 1, wherein a pattern or facial recognition routine is used to identify at least one of the user and the observer.

5. The one or more non-transitory computer-storage media of claim 1, wherein the database includes one or more appearance parameters settings associated with the observer that specify how the at least one augmented appearance of the user is rendered.

6. The one or more non-transitory computer-storage media of claim 1, wherein the database includes one or more conditions settings that specify how and when the at least one augmented appearance is rendered.

7. The one or more non-transitory computer-storage media of claim 1, wherein the rendering the at least one augmented appearance further comprises rendering metadata and other information relating to the user.

8. The one or more non-transitory computer-storage media of claim 1, wherein the rendering the altered appearance further comprises tracking the movement of the user and synchronizing appearance alterations of the user so that the at least one augmented appearance is presented proportionally and consistently based on the relative position of the user to the first wearable vision device.

9. One or more non-transitory computer-storage media having computer-executable instructions embodied thereon that, when executed by one or more computing devices, perform a method of creating an altered appearance profile of a user to be displayed when viewed through a first wearable vision device, the method comprising:

receiving one or more appearance parameters associated with a user;

associating at least one appearance parameter with at least one appearance condition;

storing the associated appearance parameter and appearance condition in an appearance profile associated with the user;

identifying the user based on the appearance profile; and rendering for the user, via a second wearable vision device, a picture-in-picture image of the user's appearance including one or more appearance augmentations based on the appearance profile.

10. The one or more non-transitory computer-storage media of claim 9, wherein the at least one appearance condition includes a condition relating to how and when the one or more appearance parameters are presented.

11. The one or more non-transitory computer-storage media of claim 9, wherein the appearance profile includes graphics information used for rendering the altered appearance.

12. The one or more non-transitory computer-storage media of claim 9, wherein the appearance profile includes information specifying how the user appears to the viewer.

13. The one or more non-transitory computer-storage media of claim 9, wherein the appearance profile includes information specifying how the viewer appears to the user.

14. One or more non-transitory computer-storage media having computer-executable instructions embodied thereon that, when executed by one or more processors, provides a method for presenting one or more user interfaces for facilitating creating an altered appearance of a person or object when viewed through a wearable vision device, the method comprising:

rendering a profile settings menu that includes menu items relating to a user's various social-contacts groups, wherein the profile settings menu is displayed to the user wearing the wearable vision device when the user is facing a reflection of the user in a mirror:

rendering an appearance settings menu that includes menu items relating to altering how the user will appear to others when viewed through the wearable vision device, wherein the appearance settings menu is displayed to the user wearing the wearable vision device when the user is facing the reflection of the user in the mirror; and rendering a picture-in-picture display showing a representation of the user wherein the representation comprises an application of an appearance augmentation to the user.

15. The one or more non-transitory computer-storage media of claim 14, further comprising rendering a social contacts settings menu item for setting the user's appearance profile settings relating to the appearance of the user to one or more of friends, close friends, family, selected friends, gaming community, clients, contacts, and others.

16. The one or more non-transitory computer-storage media of claim 14, further comprising rendering a privacy menu item for setting the user's appearance profile settings, including a private option and a public option.

17. The one or more non-transitory computer-storage media of claim 14, further comprising rendering a customize appearance menu item for customizing appearance attributes relating to one or more altered appearances for the user and for customizing appearance attributes relating to the appearance of other objects or persons viewed by the user.

18. The one or more non-transitory computer-storage media of claim 14, further comprising rendering a conditions menu item for specifying conditions for how and when the one or more altered appearances for the user are presented when viewed through the wearable vision device.

19. The one or more non-transitory computer-storage media of claim 14, further comprising rendering an import appearance menu item for importing altered appearance attributes and settings.

20. The one or more non-transitory computer-storage media of claim 14, further comprising rendering an emotion appearance menu item, which applies an emotional visual cue to the one or more altered appearances for the user.

* * * * *